Aug. 17, 1926.
S. P. ENRIGHT
1,596,415
COFFEE AND TEA POT
Filed Oct. 1, 1925
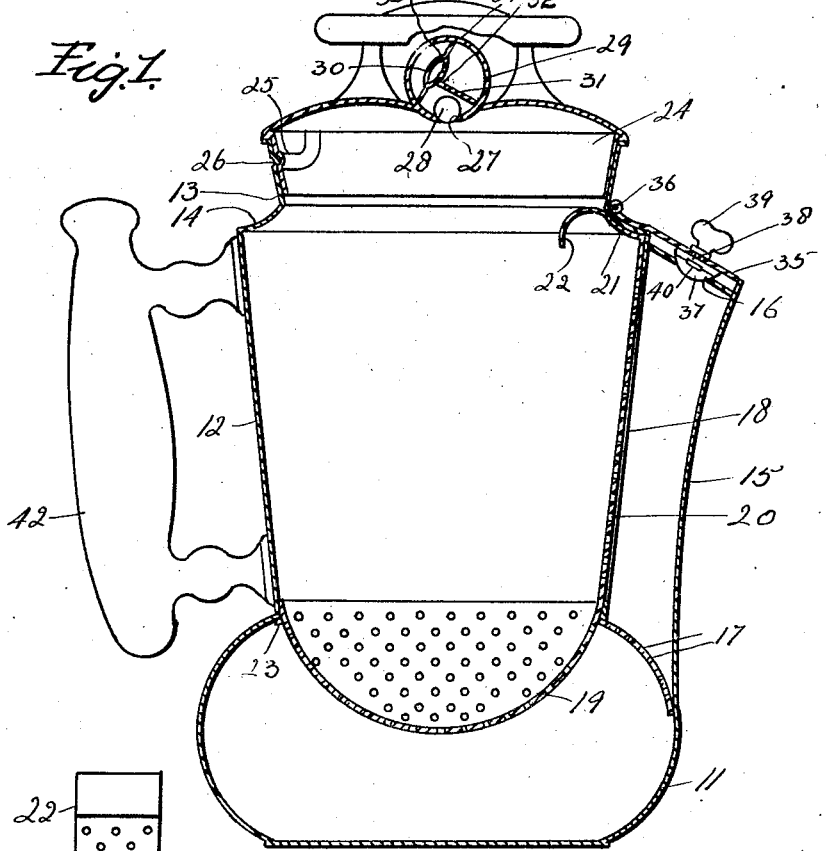
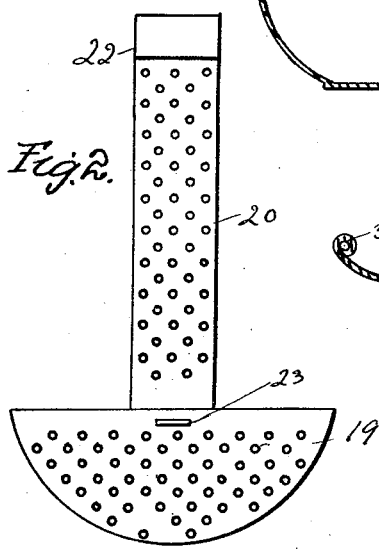
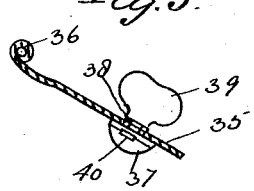
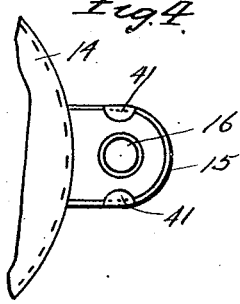
Inventor
Stephen P. Enright
By W. W. Williamson Patented Aug. 17, 1926.

1,596,415

UNITED STATES PATENT OFFICE.

STEPHEN P. ENRIGHT, OF PHILADELPHIA, PENNSYLVANIA.

COFFEE AND TEA POT.

Application filed October 1, 1925. Serial No. 59,773.

My invention relates to new and useful improvements in coffee and tea pots, and has for its object to so construct such a utensil and to combine elements therewith that the ground coffee or tea placed within the pot will be held in a perforated bowl, and prevented from coming in contact with the bottom of the pot, thus preventing the scorching of the tea or coffee and the consequent marring of the taste of the liquid brewed therefrom.

A further object of my invention is to so construct a pot that it may be closed steam tight against light pressures, while permitting the steam pressure when reaching a predetermined degree to blow off.

A still further object of my invention is to provide for an audible signal which will be sounded upon the blowing off of the steam.

With these and other ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a vertical sectional view of a coffee or tea pot made in accordance with my invention.

Fig. 2, is a detailed elevation of the perforated bowl carrying the closure for the spout.

Fig. 3, is an edge view of the spout lid.

Fig. 4, is a plan view of the upper end of the spout, the body of the pot being broken away.

In carrying out my invention as here embodied, 11 represents the base of a coffee or tea pot, which base is in the general form of a flattened globe, and 12 represents the body of this pot which extends upward from the base slightly flaring outward so that its upper end will be somewhat larger than the lower end thereof at the point of union with the base.

13 represents the mouth of the pot which is of less diameter than the upper portion of the body and is also flared outward and united to the body by a curved section 14.

This construction of the pot gives it the general appearance of an urn; the contours of which are utilized for the proper functioning thereof.

15 represents the spout which extends upward from the base 11 and has its upper end closed, with the exception of the opening 16 in the top thereof, and the bottom of this spout is in communication with the base by means of the perforations 17 in that portion of the wall of the base covered by the spout, as clearly shown in Fig. 1. This spout is also in free communication with the interior of the body since that portion of said body over which the spout is located is cut away in the form of a long slot, indicated at 18.

19 represents a perforated bowl adapted to fit within the body 12 and be supported at the lower end thereof, and this bowl has a perforated strip 20 projecting upward from the edge thereof. Said strip adapted to lie over the slot 18 thus straining any liquid which may pass from the body to the spout; and this strip 20 is provided with a latch 21 terminating in the curved finger piece 22, said latch being adapted to spring beneath the curved section 14, and thus hold the bowl and the perforated strip in position against accidental displacement, while at the same time it permits the ready withdrawal of the bowl by springing the strip inward, which may be accomplished by applying the finger to the curved finger piece, 22, as will be readily understood. This bowl 19 has a lug 23 projecting opposite thereto to the closure strip 20, and said lug is adapted to latch beneath the lower edge of the body to assist in holding the bowl in place.

24 represents the cover of the pot and is of the proper shape to fit snugly within the mouth 13 and is provided with some suitable fastening to hold it against accidental displacement, such as a bayonet slot 25 pressed into the wall of this cover, which slot is adapted to coact with the lug on the inner wall of the mouth so that when the top is placed within the mouth, a slight turn thereof will carry the slot over the lug and so lock the cover in place. The cover 24 has an opening 27 in the top thereof which opening is normally closed by the ball 28 of sufficient weight to permit the generation of steam within the pot to a predetermined pressure when said ball will be forced off its seat and the steam permitted to escape.

29 represents a knob or housing enclosing the ball, and the interior of this knob is provided with the partitions 30 and 31; a hole 32 is formed to the partition 31 and a whistle 33 is so located upon the partition 30 as to be in the path of the escaping steam, the flow of which will give an audible signal for calling attention to the fact that the contents of the pot has reached the predetermined temperature; 34 being the outlet hole of the escaping steam.

35 represents the spout lid which is hinged at 36 and carries upon the under side thereof a semi-spherical valve 37 which latter is connected by a short shank 38 to the thumb knob 39, said shank passing thru a hole in the lid 35 of greater diameter than itself in order that slight play may be given to the valve 37. This valve 37 is adapted to seat upon the opening 16 and has the lugs 40 projecting therefrom for passing under the projections 41, so that when the lid is closed, the turning of the knob 39 will carry these lugs 40 beneath the said projections and thus draw the valve 37 steam tight upon the opening.

Any suitable handle 42 may be mounted upon one side of the body, preferably opposite the spout so as to facilitate the pouring of the contents of the pot, and also to give a symmetrical appearance to the device.

In practice it will be found that a pot of the construction and arrangement above described will greatly facilitate the brewing of coffee or tea, especially of the former, since the ground coffee being contained in the perforated bowl is kept out of contact with the bottom or the highly heated surfaces of the pot, and thus is never overheated, and therefore the flavor of the liquor brewed from the coffee is not marred; and the fact that this brewing takes place under slight steam pressure greatly enhances the taste and quality of this liquid.

A pot constructed as above also has the great advantage of the easy removal of the grounds by the lifting out of the bowl 19 which gives free access to all parts of the interior of the pot for cleansing.

After the coffee or tea has been brewed, the unlocking of the valve 37 by the proper manipulation of the knob 39 will permit the spout lid 35 to automatically swing open when the pot is tilted for pouring a portion of its contents into a cup but said valve will be reseated when the pot is again brought to the vertical. The reseating of the valve will retain the vapor and heat in the pot and thus prevent the escape of the aroma of the coffee or tea.

It will also be found in practice that the liquid will not boil over, since the pot when in use is liquid tight, the only escape being thru the valve seat by the lifting of the ball valve.

Of course I do not wish to be limited to the exact details of construction as herein shown as these may be varied within the limits of the appended claims without departing from the spirit of my invention.

Having thus fully described my invention, what I claim as new and useful is:—

1. A cooking utensil for brewing coffee, tea and the like, comprising a base, a body and spout, said spout being in communication with the body thru perforations, and also in communication with a perforated bowl for suspending the material to be brewed above the bottom of the utensil, a strip carried by the bowl, said strip adapted to act as a partition between the spout and the body and also serving as a means for removing the bowl, means for sealing the interior of the utensil against a certain steam pressure and means for relieving said pressure at a predetermined point, and means for giving an audible signal when said pressure is relieved.

2. In a pot of the character described, a base, a body, a spout communicating with interior of said base and body, means for closing the upper end of the spout against the escape of steam, a cover adapted to fit steam-tight in the mouth of the pot, means for locking said cover, a ball valve adapted to close escape hole in the top of said cover, a housing surrounding the ball, means contained within the housing to give an audible signal when the ball is blown off its seat by steam pressure within the pot and a perforated bowl adapted to fit within the pot and be suspended above the bottom of the latter, a strip carried by the bowl adapted to serve as a partition between the spout and body of the pot; means for holding said bowl and strip in position and means for removing the same.

3. In a pot of the character described, an enlarged base, a body suspending upward from said base, a spout connected with the base and body, perforations forming a communication between the spout and base, a perforated bowl removably fitted within the body and fastened above the bottom of the base, a perforated strip carried by the bowl, said strip being adapted to serve as a partition between the spout and the body; means for locking said strip in place, and means for removing the strip and the bowl.

4. In combination with a pot of the character described having a flared mouth, a cover adapted to fit tightly in said mouth; means for locking the cover in place, a housing mounted upon the cover, a ball valve located within the housing and normally seating upon a hole leading from the cover to the housing, and means within the housing for sounding an audible signal when said ball is blown off the seat by steam pressure created within the body.

5. In combination with a coffee pot of the character described a spout, the upper end of which is closed, said closure having a hole therein for the outflow of the contents of the pot, a valve for normally closing said hole, a lid to which said valve is swivelled, said lid being so hinged as to automatically swing the valve off its seat when the pot is tilted and return same valve to its seat when the pot is again righted, and means for locking the valve upon said hole.

6. A tea and coffee pot comprising a body having an open upper end, a spout leading from the body and having an apertured closure at its outer end, a hinged lid normally covering the outer end of the spout, a valve carried by said lid for coaction with the hole in the closure, means forming a part of the valve whereby the latter and the lid by which it is carried may be held in closed positions, a cover for the open end of the body and provided with an outlet aperture, a free valve normally closing the aperture and unseatable by steam pressure within the pot body, said steam being normally retained within the pot by the two valves, and an audible signal operable only when the free valve is unseated.

In testimony whereof, I have hereunto affixed my signature.

STEPHEN P. ENRIGHT.